COATING OR PLASTIC.

6    106/86

*substance as an aggregate in concrete*
*After concrete has set removes this substance leaving innumerable pores in hard mass*

E. WALTER.
LIGHT WEIGHT ARTIFICIAL CEMENT STONE FOR BUILDING PURPOSES.
APPLICATION FILED FEB. 19, 1919.

1,344,324.                                   Patented June 22, 1920.

INVENTOR
Ernest Walter
BY
Wm H Caufield
ATTORNEY.

UNITED STATES PATENT OFFICE.

ERNEST WALTER, OF MONTCLAIR, NEW JERSEY.

LIGHT-WEIGHT ARTIFICIAL CEMENT STONE FOR BUILDING PURPOSES.

1,344,324.  Specification of Letters Patent.  Patented June 22, 1920.

Application filed February 19, 1919. Serial No. 278,056.

*To all whom it may concern:*

Be it known that I, ERNEST WALTER, a citizen of the United States, and a resident of Montclair, county of Essex, and State of New Jersey, have invented certain new and useful Improvements in Light-Weight Artificial Cement Stone for Building Purposes, of which the following is a specification.

This invention relates to an improved unit or element for building purposes, made of what, in the building trade, is known as "cement", the usual mixture of hydraulic cement and fine mineral aggregates such as sand and the like.

The material is adapted for molding or pressing into blocks, slabs or other desired shape, and I have described the material and article in this specification as applied to a slab.

The element made up of the material as I treat it is hard and firm, but extremely light, and to the eye has the appearance of being spongy. The mass of the material has openings which are preferably globular or substantially so, these openings being disposed as desired, but usually are equally distributed throughout the mass.

This material is usually made by the process described in my application for patent for process of making porous concrete, filed Oct. 31, 1918, Serial No. 260,442.

In order to fully disclose my invention I will hereinafter describe the process referred to above with sufficient detail to enable any one skilled in the art to understand the invention.

Figure 1:
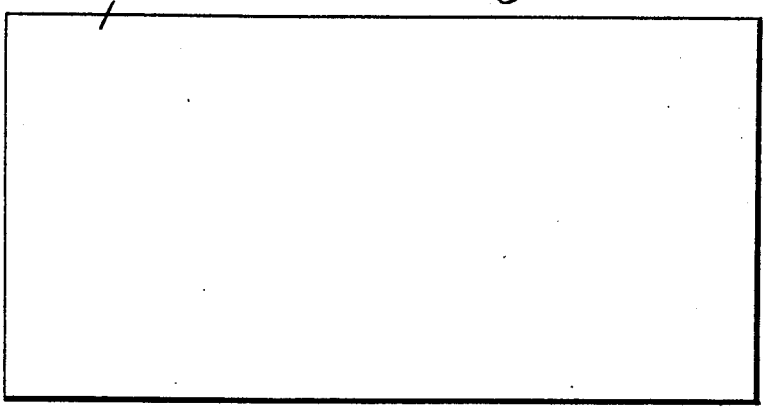
Figure 2:
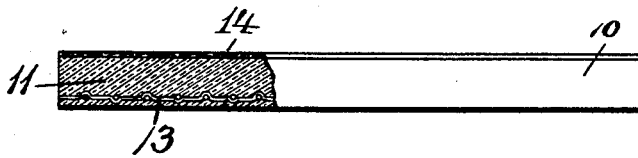
Figure 3:
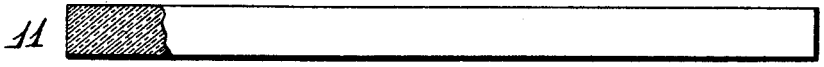
Figure 4:
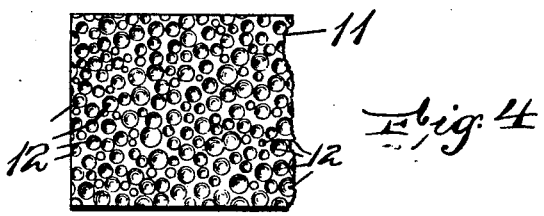

I have illustrated several forms of slabs made according to my invention in the accompanying drawing, in which Figure 1 is a face view of a slab, and Fig. 2 a side view, broken away at one end to illustrate the interior disposition of the parts thereof. Fig. 3 is a view similar to Fig. 2, of a simple slab made according to my invention. Fig. 4 is an enlarged view of the left hand end of Fig. 3, in order to show the openings in the material with sufficient clearness, which, if shown in Fig. 3, would be too small to enable a clear understanding of the invention.

The invention can be presented in different forms, such as blocks, bricks, in fact any form of building element, and also for articles used in other lines, but to enable a clear description and understanding I will describe in this specification a slab which can be used in the erection of walls, partitions, floors, ceilings and other like locations.

In the drawing I show a slab 10 which is of the kind that would be used for ceiling plates, and which has a body portion 11 made of cement made light, but stable, by my improved process. The material used is hydraulic cement and fine mineral aggregates, such as sand, which are employed in making "cement" blocks and the like, which material is mixed with extractable material before the cement sets. The extractable material is of a nature that is of a substantially neutral character with respect to Portland cement, and like cementitious material. It should be capable of being mixed with the cement at ordinary temperatures above freezing, not soluble in water and readily extractable by heat or by extracting agents which do not injure the cement.

Extractable materials capable of use in this connection are paraffin wax, naphthalene, dichlorbenzol, sulfur and the like, and are preferably formed in particles of about $\frac{1}{32}$ to $\frac{1}{4}$ inch in diameter, although I do not wish to be understood to be limiting myself to particles within these dimensions. The extractable material is preferably formed into round or substantially round particles, so that when extracted, the openings left by the material are provided with rounded walls so that a succession of closely connected miniature arches or trusses are presented.

After the particles of extractable material are mixed with the cement and the cement has set, the cement is subjected to treatment not injurious to the cement, but capable of removing the extractable material. In the case of paraffin wax, heat will melt the paraffin and it will flow from the openings, leaving the cementitious matter permeated by substantially small openings. The paraffin that remains in the minute pores is usually removed by the use of super-heated steam. The extractable material may be removed by a suitable solvent instead of heat, if desired; for instance, paraffin wax may be removed by gasolene, benzin, carbon tetrachlorid and the like.

Such extraction of the extractable material leaves openings or recesses 12 which leave sufficient cement in the element to provide adequate strength. For use in partitions and the like, slabs made as herein described are well adapted. A nail can be driven through a slab of this kind, and it can be sawed with an ordinary saw, and the slab is light enough to be very easily handled by a single individual. Such slab is also very well adapted for use in cold storage rooms, boiler rooms, drying rooms and the like. In drying rooms, a solid wall or slab easily transmits heat and condensation takes place to a great extent on the face exposed to the lowest temperature, and very often damage to goods results. In my improved slab the recesses or perforations do not permit such ready transmission and little, if any, condensation takes place.

If desired, the building element can be suitably treated or coated. In Fig. 2 I illustrate one form of floor plate with metal reinforcing means 13, such as a coarse wire mesh near the bottom, to take up the tensile strain, the body portion 11 being provided with the openings or recesses 12 and thus being light in weight, but having the required strength to withstand shear. The top coating 14 can be made heavy enough to withstand the strain of compression and to insure a good wearing surface.

Other dispositions of strengthening means can be made and various dimensions and shapes of blocks or slabs provided.

The element made up as defined in this specification is thus uniformly made porous, the weight per cubic foot or other unit is substantially constant or regular, according to the predetermined amount of pores or openings to be made in the element, and a reliable and light product is the result.

I claim:

1. An element used for building purposes containing only hydraulic cement and fine mineral aggregates and having air holes disposed throughout the mass of the element.

2. An element for building purposes containing only hydraulic cement and fine mineral aggregates, said element having within its mass comparatively small air holes.

3. An element for building purposes containing only hydraulic cement and fine mineral aggregates, said element having within its mass comparatively small air holes, said holes having curved walls.

4. An element for building purposes made only with mineral matter and which resists the action of water and which has globular openings substantially uniformly disposed throughout its mass and of more volume than the solid matter in the element.

5. An element made of hydraulic cement and which resists the action of water, said element having approximately globular openings throughout the mass of the element, said openings being of greater volume than the solid matter of the same cubic content.

6. A light-weight hydraulic cement stone which is uniformly provided with substantially globular openings.

7. A light-weight hydraulic cement stone which is uniformly provided with substantially globular openings, the volume of said openings being in excess of the volume of the solid matter.

8. A light-weight hydraulic cement stone having air holes fairly uniformly distributed within the mass of the concrete, said air holes having approximate minimum and maximum dimensions of $\frac{1}{32}$ and $\frac{1}{4}$ inch, respectively.

9. A light-weight artificial hydraulic cement stone provided fairly uniformly with approximately globular-shaped air holes from $\frac{1}{32}$ to $\frac{1}{4}$ inch in diameter, the solid mass of the stone being of uniform character.

10. A light-weight artificial hydraulic cement stone provided fairly uniformly with approximately globular-shaped air holes from $\frac{1}{32}$ to $\frac{1}{4}$ inch in diameter, the approximate uniformity in the disposition of the air holes being the same throughout the mass.

11. A light-weight hydraulic cement stone having fairly uniformly disposed small air holes disposed in the mass, and a finishing layer on said stone to provide a smooth surface.

In testimony that I claim the foregoing I have hereto set my hand this 18th day of February, 1919.

ERNEST WALTER.